US007287217B2

(12) United States Patent
Kuznetsov et al.

(10) Patent No.: US 7,287,217 B2
(45) Date of Patent: Oct. 23, 2007

(54) METHOD AND APPARATUS FOR PROCESSING MARKUP LANGUAGE INFORMATION

(75) Inventors: Eugene Kuznetsov, Cambridge, MA (US); Heather D. Achilles, Hudson, NH (US); Steven R. Willis, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/883,018

(22) Filed: Jul. 1, 2004

(65) Prior Publication Data

US 2006/0236224 A1 Oct. 19, 2006

Related U.S. Application Data

(60) Provisional application No. 60/536,039, filed on Jan. 13, 2004, provisional application No. 60/539,357, filed on Jan. 27, 2004, provisional application No. 60/548,034, filed on Feb. 26, 2004, provisional application No. 60/561,030, filed on Apr. 9, 2004.

(51) Int. Cl.
*G06F 15/00* (2006.01)
(52) U.S. Cl. ..................................... 715/513
(58) Field of Classification Search ................ 715/500, 715/501.1, 513
See application file for complete search history.

(56) References Cited

U.S. PATENT DOCUMENTS 6,199,081 B1 * 3/2001 Meyerzon et al. .......... 715/513
6,493,750 B1 * 12/2002 Mathew et al. ............. 709/220
6,625,169 B1 * 9/2003 Tofano ....................... 370/466
6,925,631 B2 * 8/2005 Golden ....................... 717/115
6,988,188 B2 * 1/2006 Liu ............................. 712/225
7,072,572 B2 * 7/2006 Lee et al. ...................... 386/90
7,117,239 B1 * 10/2006 Hansen ....................... 709/200

(Continued)

OTHER PUBLICATIONS

Sundaresan et al., Algorithms and Programming Models for Efficient Representation of XML for Internet Applications, ACM 2001, pp. 366-375.*

(Continued)

*Primary Examiner*—Cong-Lac Huynh
(74) *Attorney, Agent, or Firm*—Chapin IP Law, LLC; Barry W. Chapin, Esq.

(57) ABSTRACT

Information represented in text-based markup languages, such as XML, is often a large, highly nested structure corresponding to complex patterns of metadata and/or data. Parsing such data streams via conventional software mechanisms rapidly exhibits degrading performance as the size, or volume, of data increases. Further, such do not perform dynamic modification to the output in response to feedback based on the data being parsed. An adaptive XML processing hardware apparatus processes an XML document in a manner suited to the invoking application, and processes the incoming XML into an optimal structure based on the type of data and a set of rules relating the type of the data to the output format. It also dynamically augments the output information stream based on the data, at the option of the invoking system. The generated output may take a tree form, adaptable for efficient traversal of the hierarchical structure represented by the input XML, or may involve an attribute approach, in which the XML takes the from of a stream of fixed length cells containing optimized representations of input data, or may take a combination of the two approaches, based on configuration and XML input stream.

8 Claims, 13 Drawing Sheets

U.S. PATENT DOCUMENTS

| | | | |
|---|---|---|---|
| 2002/0049788 A1* | 4/2002 | Lipkin et al. | 707/513 |
| 2002/0073399 A1* | 6/2002 | Golden | 717/114 |
| 2003/0037198 A1* | 2/2003 | Hunsaker | 710/313 |
| 2003/0046317 A1* | 3/2003 | Cseri et al. | 707/513 |
| 2003/0106021 A1* | 6/2003 | Mangrola | 715/513 |
| 2003/0131316 A1* | 7/2003 | Brown et al. | 715/513 |
| 2003/0140335 A1* | 7/2003 | Li et al. | 717/140 |
| 2003/0163801 A1* | 8/2003 | Thames et al. | 717/123 |
| 2004/0006741 A1* | 1/2004 | Radja et al. | 715/513 |
| 2004/0049736 A1* | 3/2004 | Al-Azzawe et al. | 715/513 |
| 2004/0049738 A1* | 3/2004 | Thompson et al. | 715/513 |
| 2004/0103105 A1* | 5/2004 | Lindblad et al. | 707/100 |
| 2004/0168124 A1* | 8/2004 | Beisiegel et al. | 715/513 |
| 2005/0086584 A1* | 4/2005 | Sampathkumar et al. | 715/501.1 |
| 2005/0114793 A1* | 5/2005 | Jung | 715/839 |
| 2005/0193335 A1* | 9/2005 | Dorai et al. | 715/530 |
| 2005/0278710 A1* | 12/2005 | Lucas et al. | 717/136 |
| 2006/0095836 A1* | 5/2006 | Ono et al. | 715/513 |
| 2006/0106837 A1* | 5/2006 | Choi | 707/101 |
| 2006/0236224 A1* | 10/2006 | Kuznetsov et al. | 715/513 |
| 2006/0236225 A1* | 10/2006 | Achilles et al. | 715/513 |
| 2006/0236227 A1* | 10/2006 | Achilles et al. | 715/513 |
| 2007/0028166 A1* | 2/2007 | Hundhausen et al. | 715/530 |

OTHER PUBLICATIONS

Bayardo et al., An Evaluation of Binary XML Encoding Optimizations for Fast Stream Based XML Processing, ACM 2004, pp. 345-354.*

Synytskyy et al., Robust Multilingual Parsing Using Island Grammars, ACM Oct. 2003, pp. 1-13.*

Maglio et al., Intermediaries Personalize Information Streams, ACM Aug. 2000, pp. 96-101.*

Bagley et al., Creating Reusable Well-Structured PDF as a Sequence of Component Object Graphic (COG) Elements, ACM 2003, pp. 58-67.*

Geilen et al., Reactive Process Networks, ACM 2004, pp. 137-146.*

Lee et al., An Adaptive Viewing Application for the Web on Personal Digital Assistants, ACM 2003, pp. 125-132.*

* cited by examiner

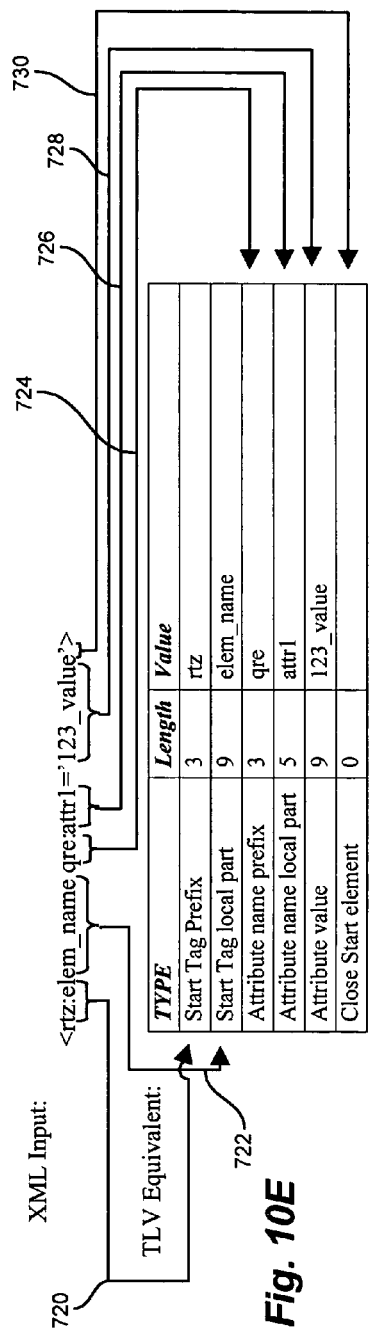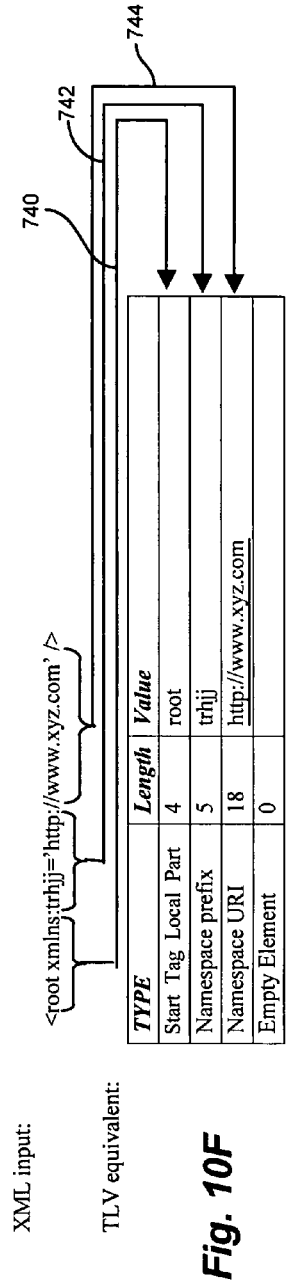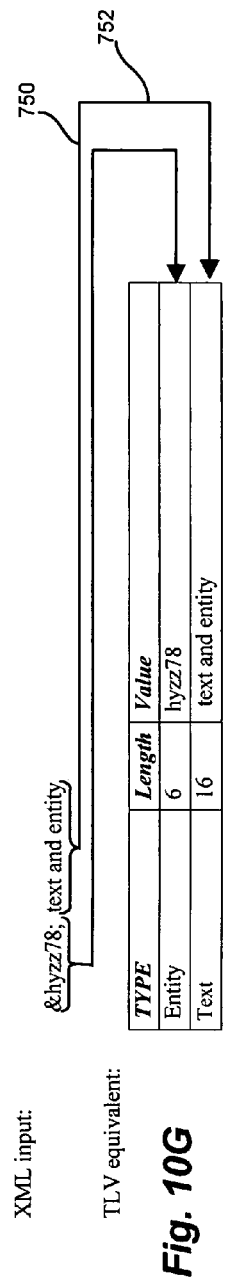
Fig. 10E
Fig. 10F
Fig. 10G

METHOD AND APPARATUS FOR PROCESSING MARKUP LANGUAGE INFORMATION

CLAIM TO BENEFIT FO FILING DATE OF EARLIER FILED APPLICATIONS

This Patent Application claims the benefit of the filing date of the following co-pending Provisional applications:

1) Provisional Patent Application entitled "METHOD AND APPARATUS FOR PROCESSING MARKUP LANGUAGE INFORMATION" filed Jan. 13, 2004, having Ser. No. 60/536,039.

2) Provisional Patent Application entitled "METHOD AND APPARATUS FOR MARKUP LANGUAGE PROCESSING AND TREE BUILDING" filed Jan. 27, 2004, having Ser. No. 60/539,357.

3) Provisional Patent Application entitled "METHODS AND APPARATUS FOR STREAM PROCESSING OF MARKUP LANGUAGE DATA" filed Feb. 26, 2004, having Ser. No. 60/548,034.

4) Provisional Patent Application entitled "METHOD AND APPARATUS FOR XML STREAM BASED XPATH EXPRESSION EVALUATION" filed Apr. 9, 2004 having Ser. No. 60/561,030. Each of the above referenced applications is assigned to the same Assignee as the present application. The entire teachings, figures and contents of the above-identified applications are hereby incorporated by reference herein.

RELATION TO CO-PENDING APPLICATIONS

This Patent Application relates to technology disclosed in the following co-pending Provisional and Utility patent applications:

5) U.S. Utility patent application entitled "METHODS AND APPARATUS FOR PROCESSING MARKUP LANGUAGE MESSAGES IN A NETWORK", Filed Dec. 22, 2003, having Ser. No. 10/745,326.

6) U.S. Utility Patent Application entitled "METHODS AND APPARATUS FOR CONVERTING MARKUP LANGUAGE DATA TO AN INTERMEDIATE REPRESENTATION", Filed Jul. 1, 2004, having Ser. No. 10/883,484.

7) U.S. Utility patent application entitled "METHODS AND APPARATUS FOR CONVERTING A REPRESENTATION OF XML AND OTHER MARKUP LANGUAGE DATA TO A DATA STRUCTURE FORMAT", Filed Jul. 1, 2004, having Ser. No. 10/883,483.

8) U.S. Utility patent application entitled "METHOD AND APPARATUS FOR STREAM BASED MARKUP LANGUAGE POST-PROCESSING", Filed Jul. 1, 2004, having Ser. No. 10/883,016.

Each of the above referenced applications is assigned to the same Assignee as the present application. The entire teachings, figures and contents of the above-identified applications are hereby incorporated by reference herein.

BACKGROUND OF THE INVENTION

Conventional information processing environments universally strive to improve throughput and processing capabilities by identifying bottlenecks and resource contention and redirecting, streamlining, or complementing the processing to mitigate inefficiency. Often, redirection of a processing stream to a more specialized processing mechanism improves performance by offloading such specialized or computationally intensive processing to the specialized processing mechanism rather than burdening a primary resource such as processor or bus. For example, early PCs employed math co-processors to complement the main processor for engineering and scientific applications requiring substantial floating point computations and/or high precision accuracy. Such specialized processing mechanism relieve the main processing resources of tasks which, although they are capable of handling, can more effectively be completed by such specialized resources not burdened with the general task handling responsibility.

In modern times, specialized processing mechanisms such as SSL offloaders, storage device subsystems, and encryption hardware, for example, are often incorporated into a base computer system to suit application specific demands. Such specialized processing mechanisms allow a common, widely installed computer system, such as a Windows or Unix based PC, to be deployed in specialized applications while still maintaining a widely accepted platform for integration with other computer systems, networks, and applications. A variety of specialized peripheral devices and interface are currently available for integration with a computer system such as a PC. These specialized peripheral devices enable processing advantages to suit particular applications, such as, for example, communications, multimedia and video, real time control interfaces, swipeable card readers, and other applications.

SUMMARY

Modern computer systems and applications frequently endorse the notion of compatibility with other applications, protocols, and operating systems. Such a demand drives the popularity of platform independent markup languages such as the Extensible Markup Language (XML), Hypertext Markup Language (HTML) and SGML (Standard Generalized Markup Language). Such markup languages are frequently based upon an operating system (OS) neutral format, such as ASCII characters, and therefore are not bound to a particular OS, processor, or language. While ASCII based source languages have been around for some time, such languages are frequently compiled by OS specific compilers, thus diluting the notion of platform independence. Further, the resulting object and executable code generated from such compilers is generally directed to a particular processor and/or operating system, and therefore likewise eludes platform independence. Accordingly, markup languages such as XML have gained tremendous popularity as a mechanism for defining general applications and data which is applicable to a variety of computers according to a well defined set of syntax rules.

Such markup languages further appeal to multi-platform environments because the well defined syntax represents a low-level, granular set of definitions which is parseable in a relatively simple manner by lightweight utilities, yet which is flexible enough to represent complex processing and data patterns due to a nested, hierarchical structure. Therefore, many users and applications employ markup languages because of the ease of implementing instructions and data, and the increasing ability of applications to receive such a format. It may be beneficial to distinguish markup languages, which provides syntactical and semantic properties of a grammar, from scripting languages, which simply purport to execute commands without interactive user direction. Therefore, while a markup language may operate as a script, the reverse is generally not possible. Accordingly, there is a growing demand for rapid parsing and processing of markup languages, such as offloading to specialized mechanisms which can efficiently digest and transform the markup form of data and instructions for use by an invoking user application.

However, conventional markup based processing often entails a "brute force" approach, performing processing by string based matching and traversal operations, often in a sequential manner. Such markup languages often employ a grammar of embedded tags, which are typically ASCII strings operable to be matched against target strings. Further, the tags often have corresponding attributes, also parseable as ASCII text. Accordingly, brute force traversal operations, while often effective, are typically an inefficient mechanism of processing such markup formats.

Configurations of the invention are based, in part, on the observation that markup languages, such as XML, often result in large, highly nested structures corresponding to complex patterns of instructions and/or data. Accordingly, processing via conventional "brute force" mechanisms such as linear parsing (i.e. sequential scanning without tokenization or hierarchical structure) rapidly exhibits degrading performance as the size or complexity (e.g. nesting depth) of data increases. Further, such approaches are typically "content blind," in that the same static approach is employed start to finish. No dynamic augmentation or modification to the parsing output is performed based on either preferences of the invoking application or in response to feedback based on the data being parsed.

Therefore, configurations of the invention substantially overcome the shortcoming of conventional markup processing by providing an adaptive and dynamic markup processing mechanism which processes XML in a manner suited to the invoking application, and which responsively augments the processed, or output, form based on the data being processed. A set of rules determines an initial configuration which identifies a particular output form congruent with the invoking application, i.e. in a form which is readily digestible by the application receiving the output representation of the processed XML. The set of rules also specifies a data policy for dynamically modifying the output form responsively to the processed data. Such rules identify types of data and a corresponding output format, which is beneficial to, or readily digestible by, the invoking application. The output form of the processed markup then changes in response to the predetermined rules, such that each portion of the processed output markup is in an optimal form. Therefore, the manner of generating the processed output selectively changes in response to the data being parsed and the needs of the invoking application. Further, the entire output structure corresponding to the XML input document is representable as a single output data structure or other unit, effectively referencing the hierarchical XML document structure in multiple integrated formats, each optimal for the specific type of data it represents, i.e. each input XML document results in an integrated output structure indicative of the entire XML document. Therefore, each XML document input results in a single output structure, either in a tree ,TLA format, or a combination of both, discussed further below.

Configuration of the invention take the form of a markup device including an XML accelerator or offloader, interfaced with a computer system such as a network device or PC, to process the incoming XML markup into an optimal output structure for the invoking (receiving) application based on the type of data and the rules relating the type of the data to a particular output format. An initializing entity, such as a configuration file, identifies the optimal output format and the rules for determining the optimal form based on the data type. The rules may be defined in a separate rule entity, such as a rules or policy file, operable to identify a plurality of conditional processing conditions for determining the output. In a particular configuration, the output may take a tree form, adaptable for efficient traversal of the hierarchical structure represented by the input XML, or may take an attribute approach, in which the XML is processed to generate fixed length cells having attributes indicative of the data carried thereby. Further, certain data may simply be parsed out as undeterministic, or may be passed through as unaugmented XML, as determined by the configuration and by the rules. The tree approach is typically well suited to applications employing traversal of large nested hierarchical structures, while the attribute, or TLA (Type, Length, Attribute) may be beneficial when stream processing and/or memory footprint are factors.

In further detail, the method for processing an information stream of a syntactical based representation of information includes parsing the information stream according to a predetermined set of syntactical rules, such as XML, in which the syntactical rules are operable to indicate the hierarchical structure of the information. A character processor, or parser, extracts tokens from the XML information stream, in which the tokens each correspond to data items and have a particular type. A generator including one or more output producers processes the parsed tokens to generate an output representation of the data items included in the information stream, in which the output representation is determinable according to the particular type of the data items, and operable to preserve the hierarchical structure for further processing by a recipient application.

In the exemplary arrangement, the method for markup document processing includes a character processor and a generator including one or more output producers. The character processor scans an input stream indicative of the markup document to identify parseable tokens having boundaries, and also checking the parseable tokens in the input stream to be well-formed by verifying conformance to a predetermined set of syntax rules, such as XML syntax conformance. The input stream including the XML is formatted by the character processor into a stream of encoded items corresponding to the input stream, in which the each of the encoded items is indicative of at least one parseable token. The markup device computes the output format based on a set of rules. The rules are dynamically responsive to the stream of encoded items, resulting in an output format determiner indicative of an optimal type (format) of output. In the exemplary arrangement, there are two output formats, either a tree or TLA format, and the output format determiner is simply a flag to indicate which of the two output formats is to be generated for a given portion of an XML document. A output producer in the generator, selected based on the computed output format, receives the encoded items, and is operable to generate an output structure having an output format corresponding to the computed output format. The generator therefore produces an output structure according to the computed output format from the output stream, in which the output structure is indicative of the structure and content of the XML markup document, i.e. retains the structure of the source XML document.

The generator selectively determines the output representation based on the processing capabilities of the recipient application, and invokes a corresponding output producer. The dynamic, adaptive output of the exemplary configuration allows selective determination of the output representation according to the particular type of the data items, and may switch from one output representation to another during processing. The exemplary configuration discussed further below employs a Type-Length-Attribute (TLA) format and a tree format of the output representation.

Determination of the exemplary output representation further includes computing an initial configuration indicative of a particular output representation, and comparing tokens in the information (input) stream to a set of predetermined rules, in which the predetermined rules indicative of the policy for selecting the output representation. The generator then dynamically applies the rules during the parsing of the input stream to augment the output representation according to the policy represented by the set of rules. The resulting output representation further includes an enumeration of the type of data item corresponding to a token, and an indication of the location of data item corresponding to the token, via an indirect reference such as a pointer. Therefore, generation of the output representation may include generating the representation of the data items in a discontiguous manner with the corresponding tokens in the hierarchical structure represented by the input stream.

In a typical exemplary configuration, the input data arrives as a continuous input stream, or sequence of bytes. In the exemplary arrangement illustrated, a given XML input stream may arrive and be processed in portions, depending on network transmission factors such as the underlying protocol and network load, as will be discussed further below. Further, multiple XML data streams may be arriving and being processed simultaneously, thereby creating the possibility that XML portions, or segments from different streams may be interleaved. Accordingly, multiple streams maintain separate contexts according to the external source, also discussed further below.

The invention as disclosed above is described as implemented on a network device or computer having a processor, memory, and interface operable for performing the steps and methods for monitoring and processing timer events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program according to any suitable programming language or medium, as is known to those of skill in the art. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIGS. 10A-10G are block diagrams of structures employed in conjunction with various types of markup data;

DETAILED DESCRIPTION

Figure 1:
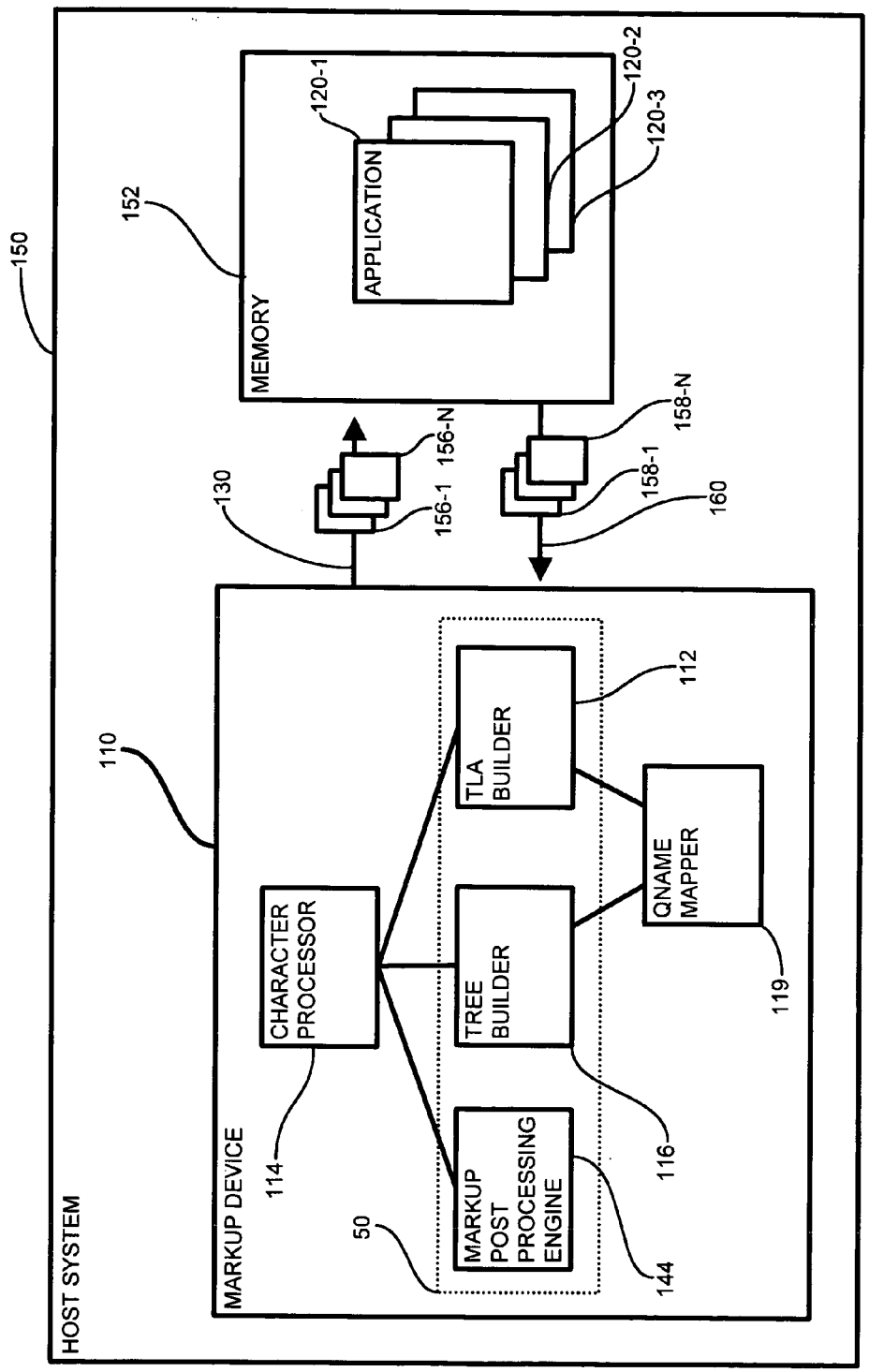
FIG. 1 is an architecture block diagram of an exemplary host computing system employing the markup device as claimed herein.

The invention as defined by the present claims is based, in part, on the observation that information represented in XML or other text-based tagged data formats (e.g. markup language), is often a verbose, highly nested structure with complex patterns of data and metadata. Accordingly, processing via conventional "brute force" mechanisms such as software parsing rapidly exhibits degrading performance as the size or the complexity of data increases. Further, such approaches are typically "content blind," in that the same approach is employed throughout the processing. No dynamic augmentation or modification to the parsing output is performed based on either preferences of the invoking application or in response to feedback based on the data being parsed.

Configurations of the invention substantially overcome the shortcoming of conventional markup processing by providing an adaptive and dynamic markup processing mechanism which processes information in an input stream such as an XML document in a manner suited to the invoking application, and which responsively augments the output information stream based on the data being processed. A set of XML rule definitions identifies a particular output form congruent with the invoking application, i.e. in a form which is readily digestible by the receiving application. The XML rule definitions may also specify a data policy, or set of rules, for dynamically modifying the output form responsively to the processed data. The rules identify types of data and a corresponding output format optimal for the invoking application. The output form of the processed markup may then change in response to the predetermined rules, based on feedback from the parser, such that each portion of the processed output markup is in an optimal form. Therefore, the manner of generating the processed output is operable to selectively change in response to the data being parsed and the needs of the invoking application. Further, an entire output structure corresponding to the input stream is representable as a hybrid data structure, including the TLA and tree formats discussed above, each format optimal for the type of data it represents. Further, alternate configurations may include additional formats applicable to other data types.

Configuration of the invention take the form of an XML accelerator or offloader, which may be installed as a network device in conjunction with a computer system such as a PC, which processes the incoming XML into an optimal structure for the receiving (invoking) application based on the type of data and the rules relating the type of the data to a particular output format. The rules may be defined in a separate rule entity, such as an XML rule definitions file, operable to identify a plurality of conditional processing conditions for determining the output via various XML processing definition languages, detailed below. In a particular configuration, the output may take a tree form, adaptable for efficient traversal of the hierarchical structure represented by the input stream, or may involve an attribute approach, in which the XML takes the from of fixed length cells having attributes indicative of data. Further, certain data may simply be parsed out as undeterministic, as determined by the rules. The tree approach is typically well suited to applications employing traversal of large nested hierarchical structures, while the attribute, or TLA (Type, Length, Attribute) form may be beneficial when stream processing and/or memory footprint are factors.

FIG. 1 is an architecture block diagram of an exemplary host computing system 150 employing the markup device 110 as claimed herein. Referring to FIG. 1 In a particular exemplary configuration, a markup processing device 110 performs markup processing of a plurality of markup streams, such as an XML input stream 160, however alternate markup languages may be employed. Referring to FIG. 1, a context diagram of the markup processing device 110 (markup device) illustrating a top level of the markup processing architecture is shown. The markup device 110 generates various types of output in a dynamically responsive manner based on the markup language being processed. The markup device 110 is operable in conjunction with a host computing system 150, such as a user PC. In the typical configuration, the markup device 110 couples to the PC via an expansion interface (i.e. expansion card slot) via the motherboard, however alternate arrangements may be employed.

The host computing system 150 includes a memory 152, operable to store and execute a plurality of applications 120-1 . . . 120-N (120 generally). The memory 152 also stores data employed by the application 120, including at least one input markup document 158-1, such as an XML document, and output markup structure 156-1 representing the processing performed by the markup device 110, described in detail below. The memory 152, therefore, is accessible to both the markup device 110 and to the application 120, and therefore operable as an interface between the application 120 and the device 110. The application 120 obtains the markup document 158-1 (158, generally) from any suitable source, and the markup device 110 returns the output markup structure 156-1 (156 generally) via a generator 50, for further processing by the application 120.

The markup device 110 architecture includes a character processor 114, a markup post processing engine 144, a TLA builder 112, a tree builder 116 and a Qname mapper 119. The character processor 114 receives the markup document 158 from the application 120 as an XML input stream 160, and generates an output structure 156-N, described in further detail below, corresponding to the XML document 158 in both structure and content.

In further detail, the input stream 160 is a byte sequence from an XML document containing yet unprocessed, or "raw" XML, according to the XML syntax, generally known in the art. The character processor 114 parses tokens from the XML stream 160. An XML token, as discussed herein, implies an atomic symbol recognized by the syntax of the XML language, and consists of one or more characters. Thus, the character processor 114 recognizes symbols consisting of characters in the input stream 160 according to the rules (syntax) of XML. Further, the character processor 114, by way of the syntax recognition, also checks the XML stream 160 for syntactical correctness.

For example, XML syntax requires that each "<" symbol (token) be matched with a corresponding ">" symbol. Further, XML delimits tag label tokens between the angle brackets. Such a tag label is an identifier such as "abc". The parsed tokens 162 corresponding to the raw XML "<abc>", therefore, are "<", "abc", and ">" respectively, and the corresponding encoded element generated by the character processor 114 is "start element 'abc'", denoted in a type-length-value form as the tuple (SE,3,abc), described further below.

Therefore, the character processor (CP) 114 receives the XML document 158 in the form of an input stream 160, and generates encoded elements 14 in the type-length-value, or TLV form. The TLV encoded elements 14 (encoded elements) are a encoded form optimized for software processing by the tree builder 116 and TLA builder 112, discussed below. Further, the character processor 114 also performs other parsing operations to facilitate output generation. For example, the character processor 114 performs various character conversions, such as whitespace normalization and conversion of the characters in the input stream 160 to a universal UTF-8 output format. One example embodiment of a character processor 114 is described in formerly referenced co-pending application Ser. No. 10/883,484.

The markup post processing engine 144 also receives the resulting encoded items 14, and determines the format of the output structure 130. The markup post processing engine 144 performs analysis on the input stream 160 by applying rules 142 (below) which are deterministic of the proper format of the output structure 130 for each type of XML element parsed. The rules 142 result from processing of XML processing definition languages 62, such as Xpath, XML schemas, XSLT and Xquery, to name several. The processing definition languages 62 are typically compiled to generate the rules 142, which collectively define a policy including rules and filters for identifying the output format based on the input document 158, described further below. The output result 156 may consist entirely of the same format, or may be a hybrid or combination of several output formats producible by the generator 50. In the exemplary configuration shown, the output results 156-N may be of a tree output format or of a TLA output format, discussed further below. One example embodiment of an output generator 50 includes a tree builder 116 and is described in formerly referenced co-pending application Ser. No. 10/883, 483. One example embodiment of a markup post processing engine 144 is described in formerly referenced co-pending application Ser. No. 10/883,016.

Figure 2:
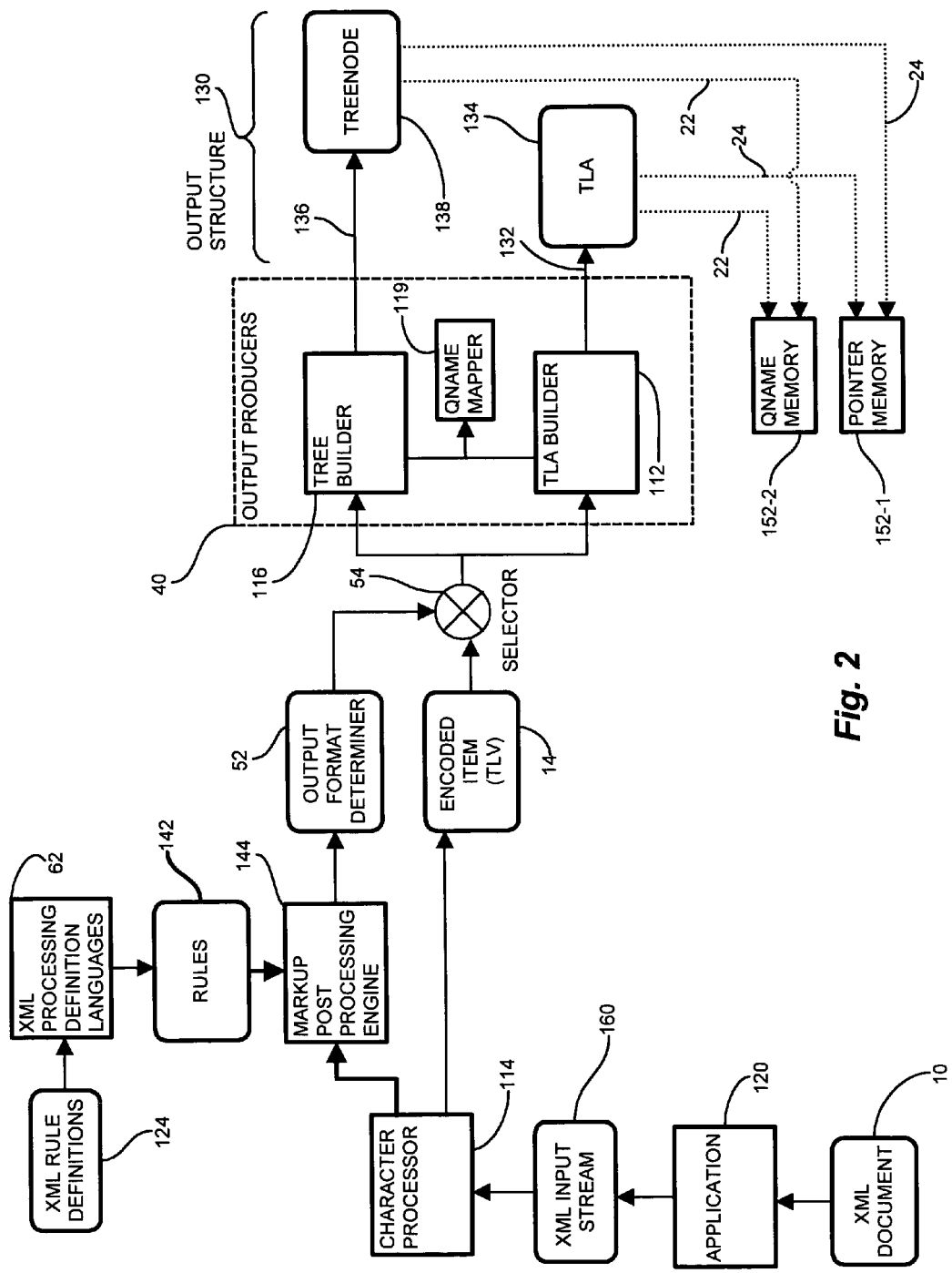
FIG. 2 is a data flow diagram of markup processing in the markup device of FIG. 1.

FIG. 2 is a data flow diagram of markup processing in the markup device of FIG. 1 showing transforms of the XML document 10 from the input stream 160 to the output structure 130, transmitted back to the application as the output results 156-N. Referring to FIGS. 1 and 2, the tree builder 116 and the TLA builder 112 are output producers 40, which collectively form the generator 50. Additional output producers 40 may be employed. A selector 54 responsive to the markup post processing engine 144 invokes the output producer corresponding to the output format selected by the markup post processing engine 144. As indicated above, the output format may be consistent throughout a particular XML document, or may be a hybrid of both the tree output format and the TLA output format.

The TLA builder produces a type-length-attribute TLA output format, which is a generally linear representation of the input stream 160 (document) indicative of the hierarchical structure of the information in the document. The TLA output format includes a type, which corresponds to TABLE I, below, an attribute indicative of the data, and a length of the attribute. The attribute is a reference to the data, and may be either a pointer or a Qname reference. A type mapping indicates, based on the type of the data, whether the reference is a pointer or a Qname. The pointer indicates the location of the data. The Qname is a computed index, based on the value of the data, to a portion of memory including one or more Qname referenced data items, discussed further below.

The tree builder 16 produces treenodes, which collectively define a linked list format having a root, or single parent, corresponding to the input XML stream 160 (document). Each treenode corresponds to an encoded item 14, and includes direct or indirect references to parent, child and sibling treenodes as defined by the structure of the input stream 160. Each treenode has a type, also corresponding to TABLE I below, indicative of the type of data it represents, and either a pointer or Qname reference to the data, also determinable by the type mapping with the TLA format.

The Qname mapper supports, inter alia, Qname generation for the output producers. Qnames are known to those of skill in the art for allowing rapid storage and retrieval of data items according to an indexing value computed on a portion of the data stored. The Qname corresponds to a data item, and indexes a storage area based on a value computed from the data item. The indexed area identified by the Qname is readily computed to reference and/or retrieve the data item. Accordingly, a Qname for a given character string is unique.

In the exemplary configuration disclosed herein, there are two tables maintained for performing Qname and string mapping, respectively. One table, given a Qname, is used to look up the corresponding character string. There is never any collision in this table since there is only one mapping of Qname to character string. The other table, given a character string, is used to look up the Qname. There are several mechanisms operable to maintain such a table—it could be a hash table, a patricia tree, or any type of standard table used for fast lookups. Depending on the lookup mechanism employed, there may be collisions because two character strings map to the same table location. In the event that they do, standard techniques are used to resolve collisions, however each Qname is unique and is resolved by mapping to a given string of characters. In this manner, Qnames result in rapid computation of the location of the corresponding data items, enabling efficient retrieval.

As indicated above, Qnames complement pointer storage techniques, and are specific to a mapping based on the data type. Therefore, Qnames are a unique representation of a character string, which are used to make post-processing of the XML document more efficient. A common post processing step is to search for a given element tag name. The Qname allows the post processing application to check each TLA or tree node for a 32 bit number as opposed to doing a character string compare, generally a cumbersome process when a large number of entries are concerned.

In the data flow of the input stream 160, continuing to refer to FIGS. 1 and 2, an application 120 presents an XML document 10 as an XML input stream 160 of characters. The input stream 160 includes tokens 162 representing XML elements according to the XML syntax, in which an element is comprised of one or more parseable tokens 162, e.g. the element "<abc>" includes 3 tokens "<", "abc", ">", as described above. The nesting of the XML elements also exhibits a hierarchical, nested structure of the XML elements, as is known to those of skill in the art.

The input stream 160 is received by the character processor 114, which generates encoded items 14, each corresponding to an XML element. The encoded items 14 are in a TLV tuple, referred to simply as TLVs above, which is a linear memory construct adapted for efficient concurrent processing by the markup device 110, and illustrated further below in FIGS. 10A-10G. The encoded items 14 are also received by the markup post processing engine 144, which dynamically computes the output format based on the input stream 160 and the processing rules 142 derived from one or more XML rule definitions 124, such as through Xpath evaluation and XML schema evaluation. In general, the rules are defined by XML processing definition languages 62, and compiled via a compiler 60 according to XML processing definition languages such as Xpath, XML schemas, XSLT, Xquery and others. The rules indicate, based on the content of the input stream 160, the output format (i.e. TLA or treenode, in the exemplary configuration). Based on this analysis, the markup post processing engine 144 sends an output format determiner 52 to the selector 54 operable to invoke the output producers 40.

As indicated above, the output producers 40 include the tree builder 116 and the TLA builder 112. The tree builder 116 receives the encoded items 14 and generates an output structure 130 in the form of treenodes 138, which collectively define the tree 136. Each of the treenodes 138 is generated from an encoded item 14 received from the character processor 114, and indicative of an XML element. The TLA builder 112 receives the encoded items 14 and generates the output structure 130 in the form of a sequence 132 of TLAs 134, also each generated from an encoded item. Further, each treenode 138 and TLA 134 include a reference to either a qname 22 or a pointer 24. The output structure 130 is receivable by the application 120, or other destination of the output structure 130, as the representation of the input XML document 10.

In further detail, the character processor 114 is operable to accept multiple interleaved documents 10, which take the form of multiple XML input streams 160, also illustrated further below. The character processor 114 maintains a separate context for each XML input stream 160 based on the source, such as the originating application 120 or thread. Interleaved input arriving from multiple stream sources (e.g. application, thread, connection) is mapped to the corresponding input stream 160, based on an underlying reliable transport mechanism. Further, input streams 160 in which particular tokens 162 are interleaved, such as a long string identifier spanning many characters or a text field, are marked with a continuation character in the resulting encoded item 14. The continuation character identifies the resulting encoded item as resulting from an incomplete, or continued, tag and allows the character processor 114 to continue and reassociate the continued identifier or string in the proper input stream 160 (string) when it is available. Therefore, the resulting encoded item 14 retains a valid TLV form which may be passed along to the output producers 40.

Referring now to the markup post processing engine 144 in further detail, the markup post processing engine 144 processes the encoded items 14 output by the character processor 114 according to the rules 142. The rules 142 are operable to dynamically determine the appropriate type of output format, and direct the selector 54 to generate the appropriate type of output via the tree builder 116 or the TLA builder 112. A compiler 62 (FIG. 4, below) receives XML rule definitions 124 corresponding to various XML processing definition languages 60 (e.g. Xpath, XML schemas). The markup post processing engine 144 receives compiled rules 142, and employs the rules to determine the output structure 130 format. For example, a typical rule might indicate a match for a particular substring, or to retrieve the Nth character for comparison, etc. In this manner, the dynamic output is generated via Xpath and XML schema evaluation, as well as via other XML based rules. The rules are responsive to compiler 142 input from the XML rule definitions 124. Therefore, the rules may result in the output format changing from tree to TLA or vice versa, depending on the input stream 160.

Figure 3:
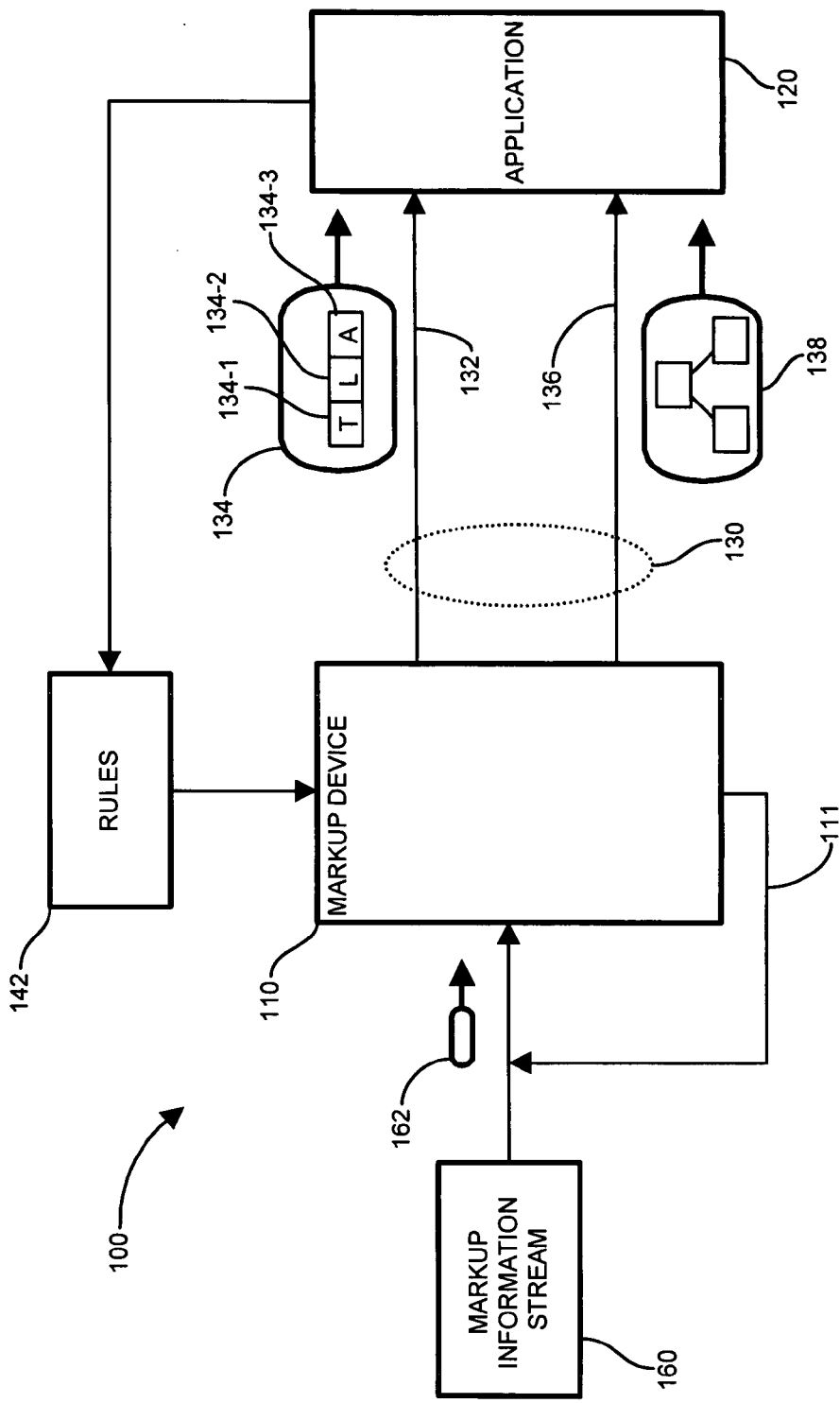
FIG. 3 is a context diagram of the host computing system in an exemplary information processing environment suitable for use in conjunction with the invention.

Having described the internal architecture of the markup device, FIG. 3 is a context diagram of an exemplary information processing environment 100 suitable for use in conjunction with the invention as claimed herein. Referring to FIG. 3, the processing environment 100, such as a computing device 150 including the markup device 110, is operable to receive the input stream 160. The input stream 160 includes tokens 162 according to the syntax and semantics of the markup language, such as the exemplary Extensible Markup Language (XML) discussed herein. Alternate arrangements may employ other markup language formats.

The generator 50 processes the input stream 160 to extract the tokens 162 and the data of the markup language, process the tokens 162 and corresponding data according to the syntax of the markup language, and present the processed output 130 to an application 120 in a form which is readily and efficiently received (digestible) by the application 120, typically for further processing by the application 120. The exemplary output structure 130 includes a Type-Length-Attribute (TLA) 132 form and/or a tree 136 output form, which may include a hybrid output which is a combination of output forms, as discussed further below. Alternate configurations may employ and selectively determine additional output formats for the output structure 130, both statically by the configuration 140 and dynamically via feedback 111 from the generator 50 via the markup post processing engine 144. In the exemplary output structure 130, the TLA form 132 includes TLA elements 134, each specifying a data type 134-1, a length 134-2, and an attribute 134-3 indicative (typically via pointer or qname) of the data. The tree output form 136 includes a hierarchy of treenodes 138, each node also having a data type and being indicative of a data item.

The exemplary configuration employs an XML markup document 10 as an exemplary input stream 160. Alternate configurations may employ other markup languages, such as Hypertext Markup Language (HTML), however the XML markup document 10 is discussed herein. Further, the markup device 110 typically takes the form of an expansion card operable to engage an expansion interface slot in a host PC. Alternate configurations, however, may employ the markup device 110 in a data communications device coupled to the user computer by various suitable means, for example. In the particular exemplary arrangement, the operations of the markup device include operations performed by Field Programmable Gate Arrays (FPGAs) and Application Specific Integrated Circuits (ASICs), however alternate configurations may take various hardware and software forms, discussed further below.

The use of FPGAs and ASICs employed in the exemplary markup device 110 allow a parallelism and pipelining aspect to processing via the markup device 110 which is not apparent from the exemplary sequential flow of FIGS. 2 and 3. In further detail, the multiple streams 160-1 . . . 160-3, corresponding to separate contexts may be processed concurrently by the markup device 110, discussed below with respect to FIG. 4. In other words, the character processor 114 may be operating on input stream 160-1, the markup post processing engine 124 operating on input stream 160-2, and the TLA builder 112 operating on input stream 160-3.

Figure 4:
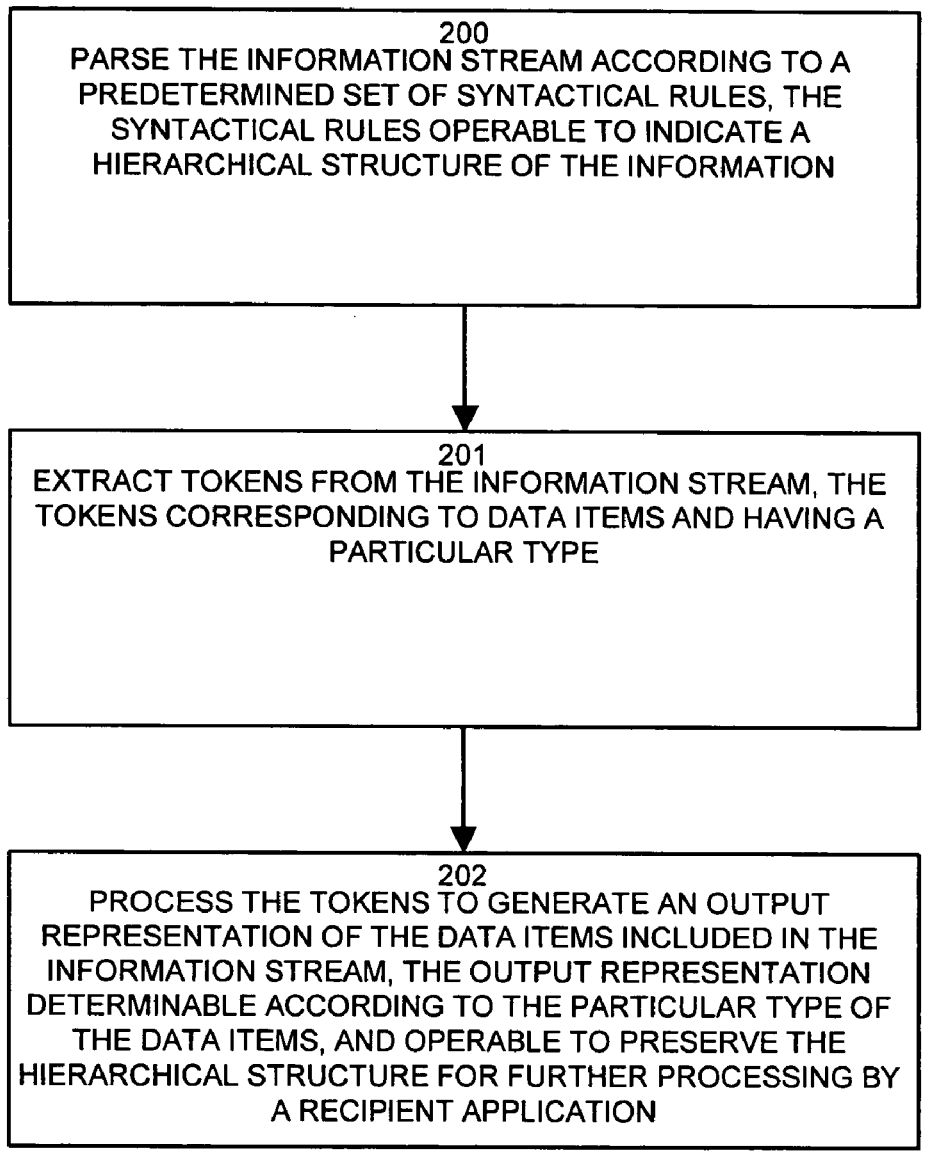
FIG. 4 is a top-level flowchart of the markup processing framework in the context of FIG. 1.

FIG. 4 is a top-level flowchart of the markup processing framework in the context of FIG. 3. Referring to FIGS. 1-4, the method for processing an input (information) stream 160 of a syntactical based representation of information includes parsing the input stream 160 according to a predetermined set of syntactical rules, such as XML, in which the syntactical rules are operable to indicate a hierarchical structure of the information, as depicted at step 200. Script languages, such as XML, are operable to encompass highly nested structures. Parsing according to the syntax rules yields a set of tokens 162 as well as the structure which the tokens 162 represent. Such a hierarchical structure often takes the form of a tree, discussed further below.

The markup device 110 parses the tokens 162 from the input stream 160, in which the tokens 162 correspond to data items having a particular type, as depicted at step 201. The tokens 162 are expressed according to the syntax of the markup language. In the exemplary XML configuration, the tokens 162 correspond to XML syntax units including tags and attributes, expressible as the encoded items 14.

After parsing strips syntactical symbols such as delimiters and terminators, the generator 50 in the markup device 110 receives the stream of encoded items 14. The generator 50 processes the encoded items 14 to generate an output structure 130 of the data items included in the input stream 160, in which the output format determiner 52 is computed according to the particular type of the data items and the rules 142. Further, the generated output structure 130 is operable to preserve the hierarchical structure represented in the XML input stream 160 for further processing by the recipient application 120, as depicted at step 202.

Figure 5:
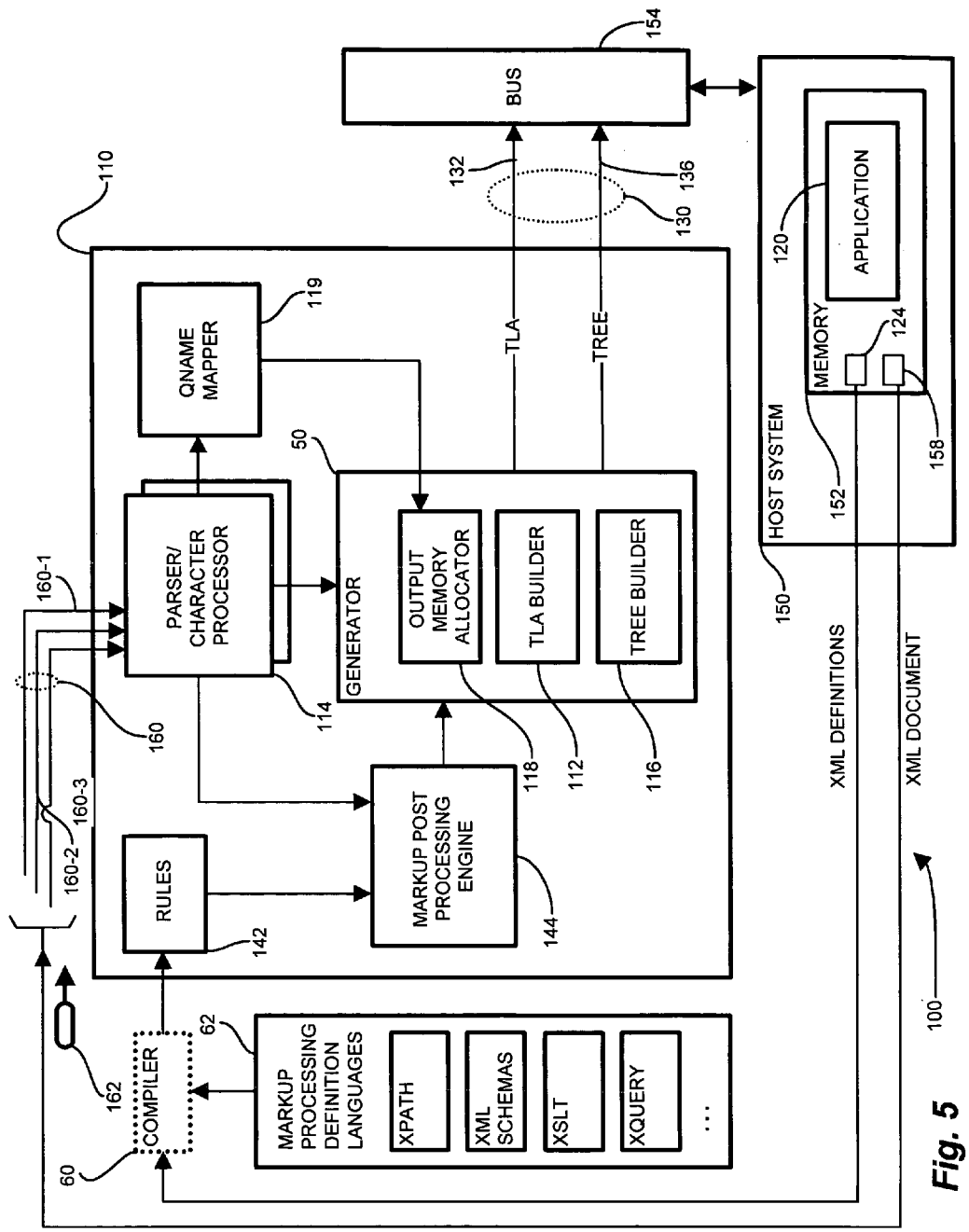
FIG. 5 is a block diagram of a markup processing framework illustrative of an exemplary configuration and operable according to the system of the present invention.
Figure 6:
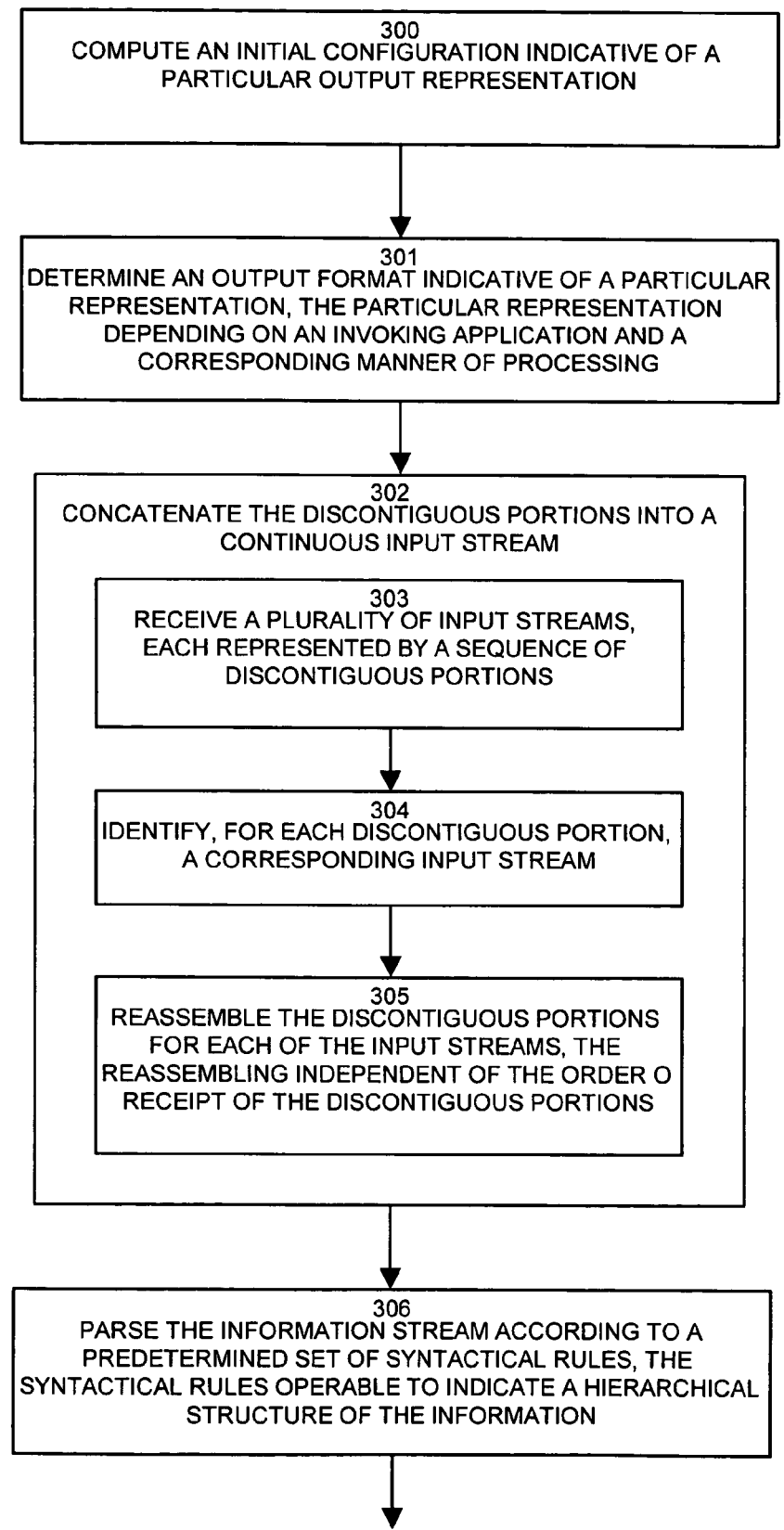
FIGS. 6-9 are a flowchart of markup processing in further detail.
Figure 7:
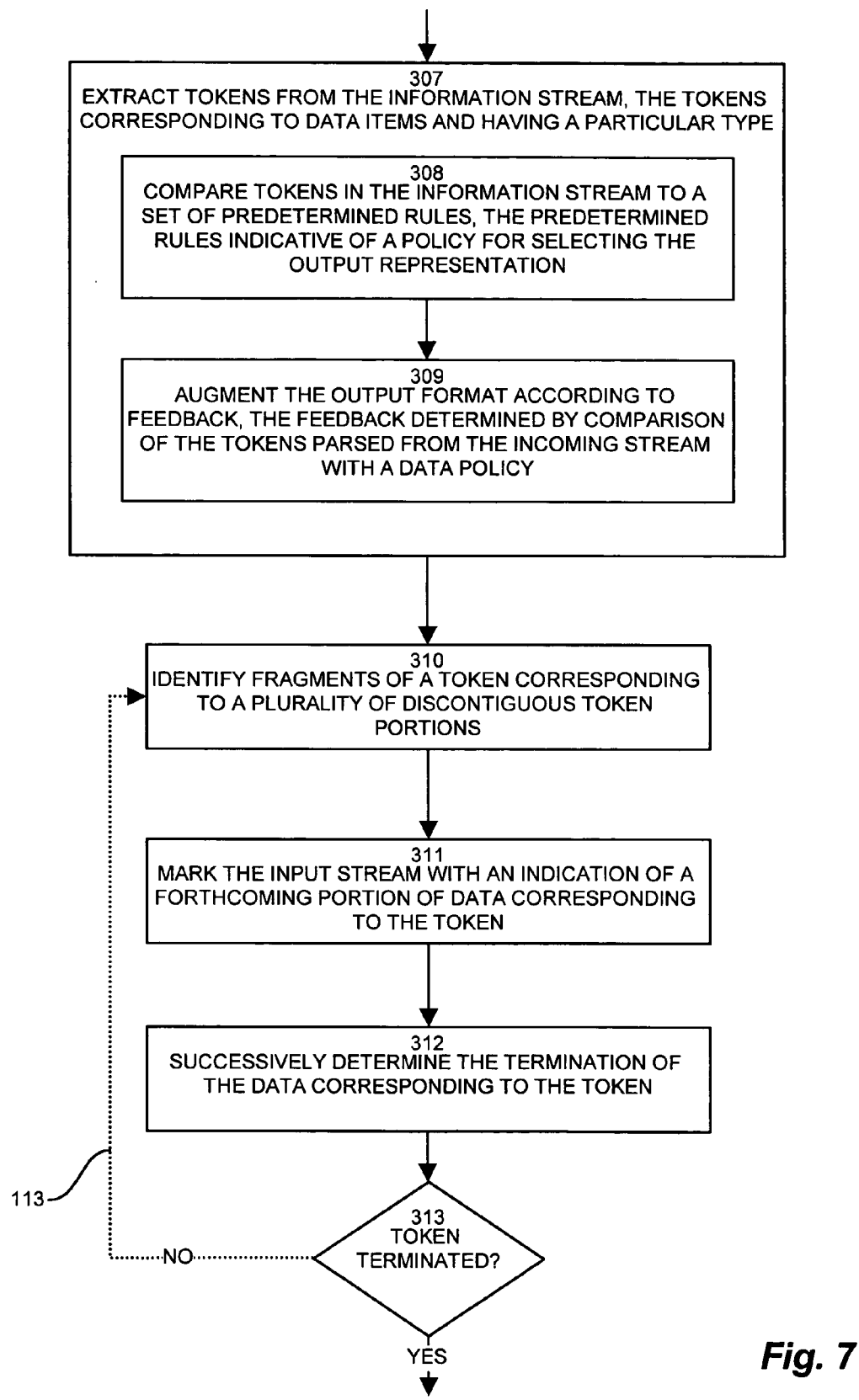
Figure 8:
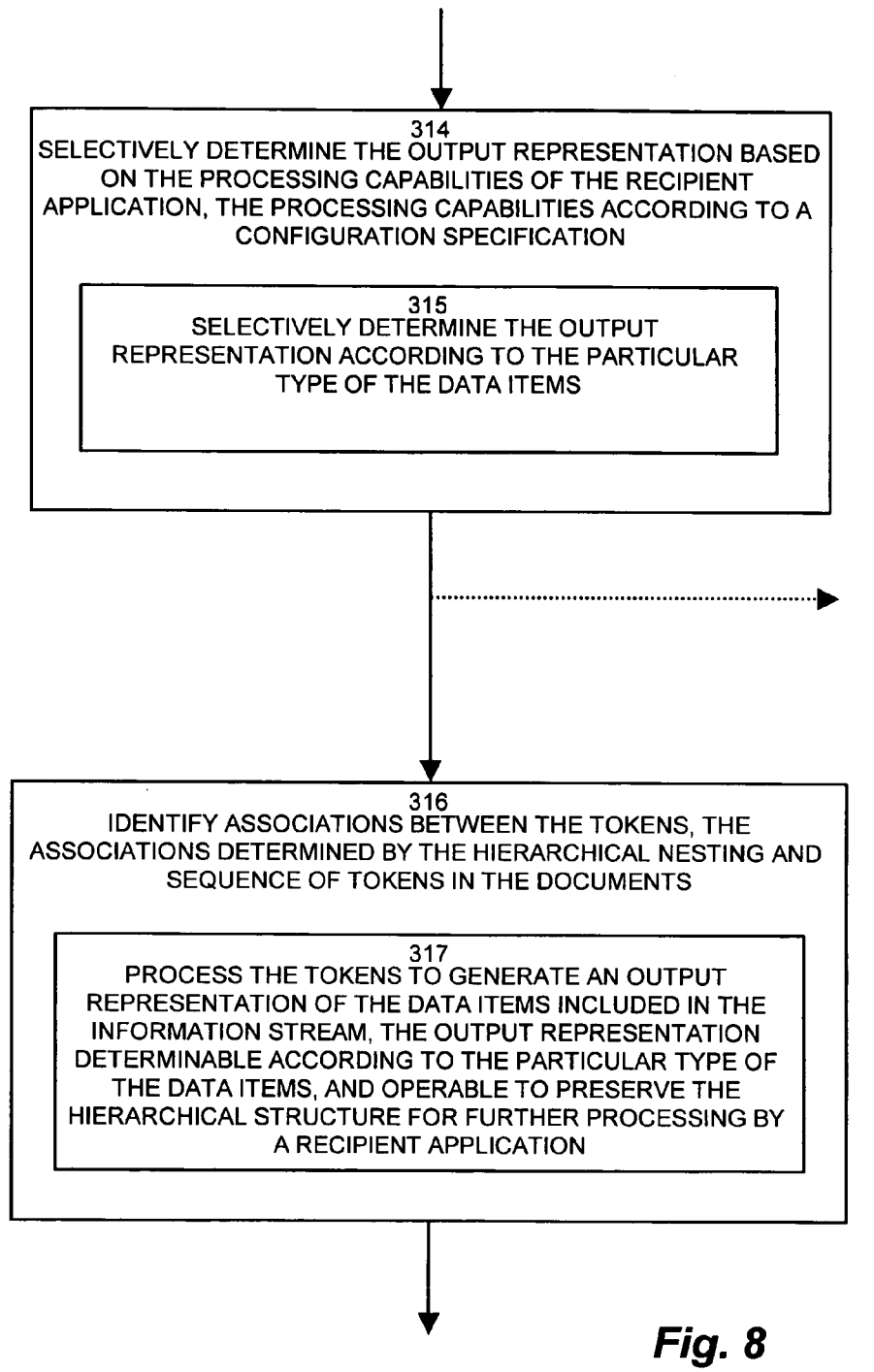
Figure 9:
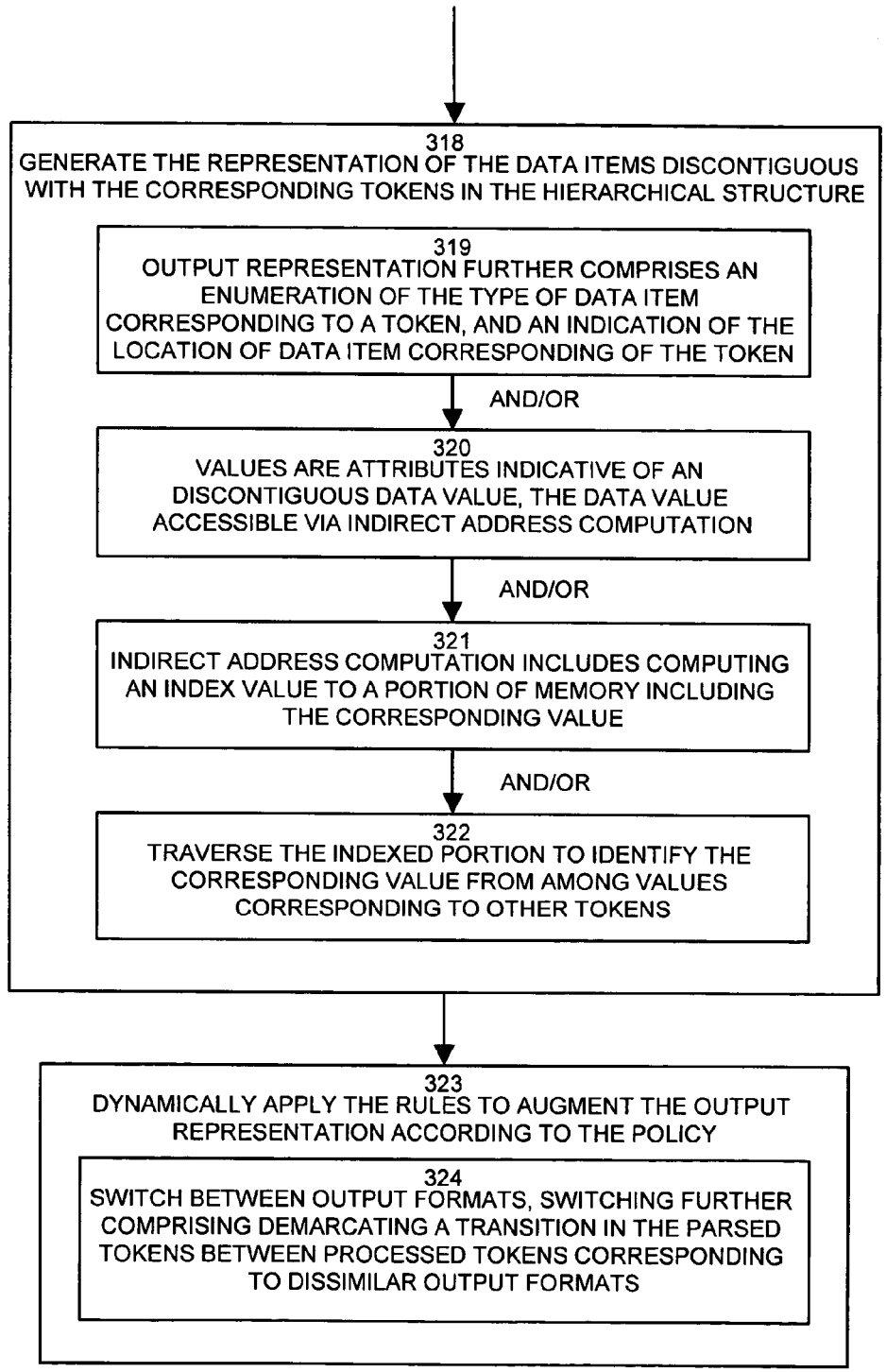

FIG. 5 is a block diagram of the markup processing framework in the environment 100 of FIG. 3 in greater detail according to the system of the present invention. In the exemplary configuration, the markup processing framework is deployable in conjunction with a computing device operating as a host system 150 for the application 120. The computing device may be, for example, a PC and the markup processing framework may take the form of a peripheral markup device (board) 110 coupled to the computing device via an expansion slot on the motherboard. In a particular configuration, the markup processing framework may be a DataPower XG4 device and related architecture, and XML Engine (DXE) and associated devices, marketed commercially by DataPower Technology, Inc. of Cambridge, Mass.

The exemplary markup device 110 couples to the host system 150 via a bus 154 operable to communicate with the memory 152 and the application 120. The memory 152 is operable to include the program and instructions of the application 120, and is further addressable from the markup device 110, although the device also includes memory operable for processing, caching, and buffering the input stream 160 and the output stream 130. Generally, the character processor 114 receives the input stream 160 as a series of data buffers received by the host system 150 according to an external protocol, such as TCP/IP, as is known to those of skill in the art. The generator 50 returns the output result 156 in an optimized form according to either the TLA 132 or tree 136 formats to the application 120 via the bus 154. The bus 154 may be, as in the particular exemplary configurations, a PCI bus, or may include an alternate transport mechanism.

The character processor 114 recognizes characters, delimiters, and other symbols of the markup language, typically as Unicode UTF-8 characters, ASCII characters or other typical character encoding. The generator 50 receives the encoded items 14 from the character processor 114, along with the set of rules 142 indicative of the format of the output structure 130. The markup post processing engine 144 may also receive the encoded items 14 as a feedback line 111 (FIG. 3), representing previously received tokens 162, for selectively computing and/or augmenting dynamic output 132, 136 based on a policy of rules 142, discussed further below. The generator 50 further includes a tree builder 116, for generating the tree 136 output format, and a memory allocator 118 for storing data items in pointer or Qname locations. As indicated above, the data items corresponding to the encoded items 14 are referenced indirectly by the attribute field 134-3 of the TLA format or from the nodes 138 of the tree format. The memory allocator 118, therefore, allocates and associates data with the corresponding output structure 130 by pointer references or via an indexing, or Qname, computation employing the Qname mapper 119, discussed further below.

FIGS. 6-9 are a flowchart of markup processing in the system of FIG. 1-3 in further detail. Referring to FIGS. 6-9, determining the output representation 130 further includes employing the rules for computing or identifying an initial configuration indicative of a particular output structure 132, 136, as depicted at step 300. While the initial output format may be derived from a configuration command block, the rules 142 specify conditions for dynamic modification of the output format responsively to the current input stream 160, discussed further below, and may also directly indicate the output format, e.g. a rule specifying tree output. From the rules 142, the generator 50 determines an output format indicative of a particular representation, in which the particular representation depends on the invoking application 120 and a corresponding manner of processing by the application 120, as depicted at step 301. In the exemplary configuration, the output format maybe either a TLA 132 or a tree format 136. In alternate configurations, such output may also take the form of direct, pass through XML, as indicated above, or may also include dropping, or parsing out, irrelevant or unnecessary sequences of information in the input stream 160.

In the exemplary configuration, the selection of the output format is initially computed according to the rules 142. In the case of an application 120 which will ultimately transmit the information in the output stream 130, the TLA representation 132 may be most beneficial since it includes a series of fixed length elements 134-1 . . 134-3. Alternatively, an application 120 which traverses the hierarchical structure of the data may operate efficiently on the tree format 136 of the data. Further, dynamic selection of the output format occurs via the markup post processing engine 144 in conjunction with the feedback 111 and the rules 142, discussed further below.

The input stream 160 may further include a sequence of discontiguous portions, in which the portions are apportioned according to an external protocol. Typically, the input stream 160 emanates from a remote system (not specifically shown) via TCP/IP or other transport mechanism, and requires stripping and processing of the TCP/IP framing in order to access the input stream 160. The character processor 114 maintains a separate context for each such input stream to identify the discontiguous portions as a continuous input stream 160, as depicted at step 302. Accordingly, the character processor 114 receives the input information stream 160 as a continuous stream according to the markup syntax, i.e. XML or other markup format.

For each of the individual input streams 160, the character processor 114 parses the information stream according to a predetermined set of syntactical rules, such as XML, in which the syntactical rules are operable to indicate a hierarchical structure of the information, depicted at step 303. The predetermined format is therefore a nested syntax adapted to indicate parsed tokens 162 and corresponding values arranged in a hierarchical order. The exemplary XML implementation exhibits a hierarchical structure in the nested arrangement of the XML document 10, as denoted by the XML syntax. The character processor 114 recognizes the control sequence exhibited by the XML format in order to yield a hierarchical structure of the parsed tokens 162 and corresponding attributes.

Having identified and reassembled a particular input stream 160, the character processor 114 parses tokens 162 from the input stream 160, in which the parsed tokens 162 correspond to data items having a particular type, as depicted at step 307, and passes the parsed tokens 162 to the generator 50. Concurrently with passing the parsed tokens 162 to the generator 50, the markup post processing engine 144, via feedback 111 (i.e. the input stream 160), compares the parsed tokens 162 in the input stream 160 to a set of predetermined rules 142, in which the rules 142 are indicative of a policy for selecting the output representation 130, as shown at step 144. The rules 142 typically specify a particular output format for a particular data type and/or XML construct. Responsive to the markup post processing engine 144, the generator 50 augments the output format 130 according to feedback 111. In other words, the feedback, represented by line 111, indicates the previously received encoded items 14 which the rules 142 may also consider. In this manner, the character processor 114 determines the feedback 111 result by comparison of the parsed tokens 162 parsed from the input stream 160 with the rules 142, as depicted at step 309. For example, the rules 142 may specify to output text data types longer than 256 characters in the TLA 132 format, rather than a tree 136 format. Alternatively, the rules may specify dropping comment field data types. Accordingly, the rules 142 may be expanded to be simple or complex depending on the input stream 160 and the requirements of the application 120.

The character processor 114 also identifies fragments of a parsed token 162 corresponding to a plurality of discontiguous portions, as shown at step 310, and marks the input stream 160 with an indication of a forthcoming portion of data corresponding to the token 162, as depicted at step 311. In particular, the underlying transport mechanism may deliver only a portion of, say, a long identifier or text field. Accordingly, the character processor marks the resulting encoded item with a continuation character to allow processing to continue. Due to the hierarchical nested structure of the input XML stream 160, such token 162 continuation occurs concurrently with passing completed tokens 162 to the generator 50. Accordingly, the character processor 114 successively determines the termination of the data corresponding to the parsed token 162, as depicted at step 312, and incorporates a stack structure to maintain nested fragmented tokens for checking for terminated open tokens 162, as shown by the test at step 313 and dotted line 113.

Upon receiving the input stream 160 of encoded items 14, the generator 50 selectively determines the output representation 130 based on the processing capabilities of the recipient application 120, as shown at step 314. Further, the generator 50 may selectively determine the output structure 130 according to the particular type of the data items via feedback 111 from the markup post processing engine 144, as depicted at step 315.

In a particular configuration, the generator 50 may generate a static output format based on the configuration file 140. Alternatively, the generator 50 generates dynamic output responsively with the feedback from the markup post processing engine 144, in which the output format (TLA or tree, in the exemplary configuration) of each parsed token 162 is deterministic from the flowchart in FIG. 12 below, shown by the dotted line after step 315. Further, the expected manner of processing corresponds to an optimal format based on the processing requirements of the invoking application 120. The output representation, in one configuration, is selectable, such as for a user who requires the input stream 160 to be consistently presented in the same TLA 132 or tree 136 format. Alternative configurations may specify a more complex rule set 142, based on the input XML, to effect generation of the output structure 130 in a hybrid form encompassing multiple types of TLA 132 and tree node 136 data, discussed further below with respect to FIGS. 10A-10G and enumerated below in Table I, respectively.

Returning to FIG. 8, in either case, the nested syntax of the input stream 160 involves identifying associations between the tokens 162 in which the associations are determined by the hierarchical nesting and sequence of parsed tokens 162 in the documents 158-N, as shown at step 316. The associations between the parsed tokens 162 indicate the hierarchical parent/child/sibling relations between the parsed tokens 162, in which the relations are derived from the predetermined format of the XML or other markup syntax capable of hierarchical nesting. The resulting output 130 maintains the relations and content corresponding to the parsed tokens 162 during the output processing. Therefore, in further detail, the exemplary configuration employing an input stream 160 and corresponding rules 142 processes the parsed tokens 162 to generate an output representation of the data items included in the input stream 160, in which the output structure 130 is determinable according to the particular type of the data items, and is further operable to preserve the hierarchical structure for further processing by the recipient application 120, as depicted at step 317.

Having determined the output structure 130 to be computed (TLA or tree for the exemplary configuration), the generator 50 generates the output structure 130 by generating the representation of the data items via an indirect reference, such as a pointer or other structure which is discontiguous with the corresponding tokens 162 in the hierarchical structure, as depicted at step 318. The generated output structure 130 therefore includes an enumeration of the type of data item corresponding to a token 162, and an indication of the location of data item, or value, corresponding of the token, as shown at step 319. Accordingly, the data items values may typically be characterized as attributes indicative of a discontiguous data value, in which the data value are accessible via indirect address computation (e.g. pointers), as depicted at step 320. Such indirect address computation includes computing an index value to a portion of memory 152-1, 152-2 including the corresponding value, as shown at step 321, and traversing the indexed portion to identify the corresponding value from among values corresponding to other tokens, as depicted at step 322.

In the exemplary configuration, data values may be referenced either by pointers or indexed by Qname references via the memory allocator 118 and the Qname mapper 119. The Qname mapper 119, operable to generate Qname references, receives parsed data concurrently with the generator 50 such that it may allocate appropriate memory 152 to receive the output structure 130 representation corresponding to each encoded item 14. Such Qname references compute an index based on the data value of the encoded item 14, and traverse memory sequentially from the indexed location in the event of Qname values mapping to similar locations. In this manner, index references are efficiently computed, and sequential traversal mitigated by a robust spread of the Qname distribution. Alternate indexing schemes, such as hashing and bucket based operations, may be envisioned by those of skill in the art.

In an ongoing manner, successive encoded items 14 sent by the character processor are receivable by the generator 50, and also received as feedback 111 such that the markup post processing engine 144 may dynamically apply the rules 142 to augment the output representation 130 according to the rules 142, as depicted at step 323. Accordingly, the resultant output driven by the generator 50 selectively switches between output formats by demarcating a transition between the encoded items corresponding to dissimilar output formats (i.e. switching between TLA 132 and tree output 136 representations) sent to the generator 50, as depicted at step 324.

TABLE I

Figure 10A:
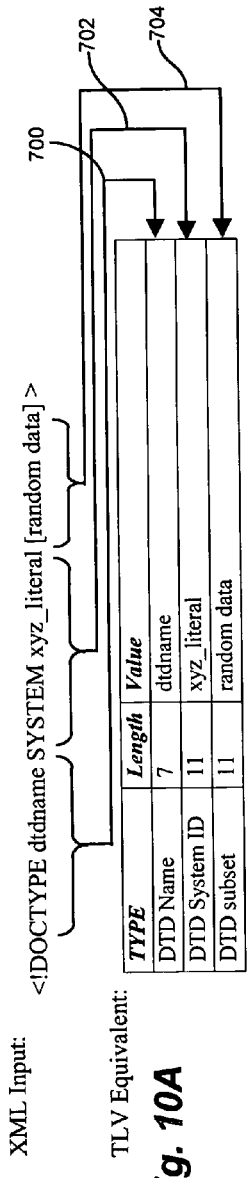
Figure 10B:
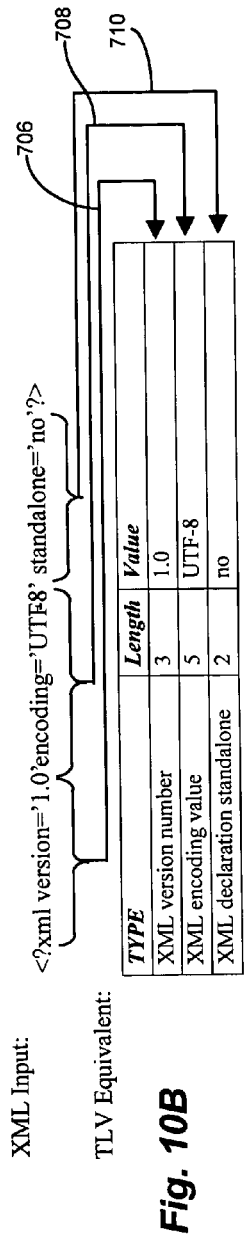
Figure 10C:
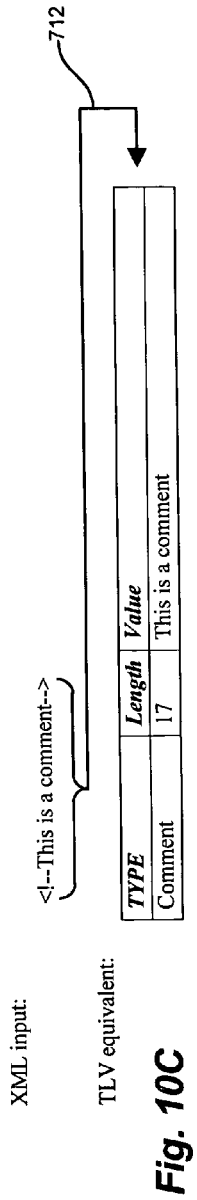
Figure 10D:
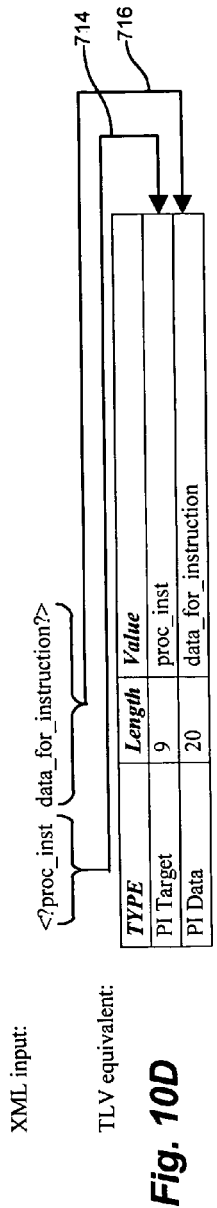
Figure 11:
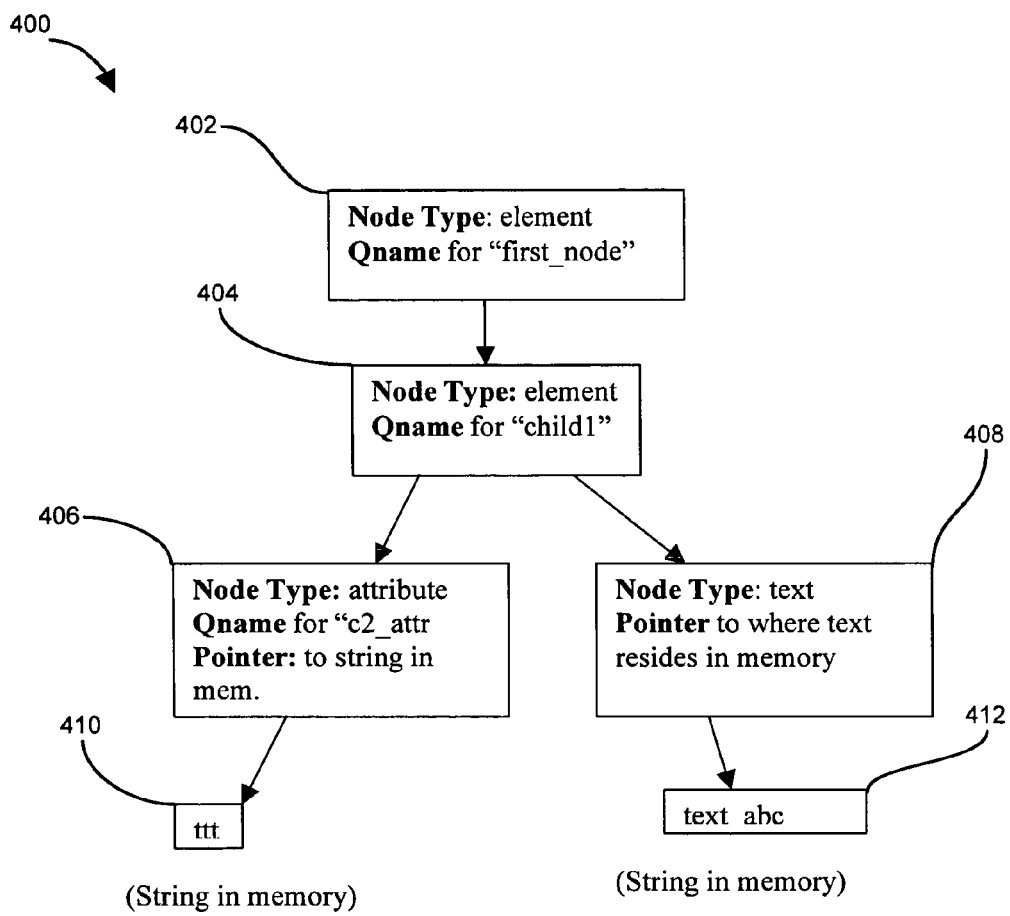
FIG. 11 is an exemplary output format exhibiting a hierarchical tree structure.

Start tag prefix
Start tag local part
End tag prefix
End tag local part
Empty element
PI target
PI Data
Comment
Attribute name prefix
Attribute name local part
Attribute Value
XML version number
XML encoding value
XML declaration standalone value
Text
DTD Name
DTD Public ID
DTD System ID
DTD Subset
Entity
Close Start Element
Namespace prefix
Namespace URI FIGS. 10A-10G are block diagrams of structures employed in conjunction with various types of markup data. FIG. 11, following, shows an exemplary tree format include treenodes. In general, a parsed token and corresponding data is representable in either a TLA format or a treenode format, as follows. Further, as indicated above, the corresponding data, or attributes, may be referenced either via a pointer or Qname. An exemplary listing of enumerated types applicable to a TLA 132 representation are listed in Table I. Treenodes 136 encompass similar types. Other types may be employed in alternate configurations. Referring to FIGS. 10A-10G, exemplary XML markup expressions are shown as TLV (Type Length Value) token representations, referred to above as encoded items 14. The TLV representation, typical of the input stream, becomes transformed into one of either the TLA or treenode (tree) output representations. FIG. 10A illustrates a DTD (Data Type Definition), shown by arrows 700, 702 and 704. FIG. 10B illustrates an XML declaration, denoted by arrows 706, 708 and 710. FIG. 10C depicts a comment TLV, via arrow 712. FIG. 10D shows a processing instruction (PI) TLV, illustrated by arrows 714 and 716. FIG. 10E shows an element and attribute TLV, depicting tokens therein by arrows 720, 722, 724, 726, 728 and 730. FIG. 10F shows namespace and empty element TLVs, shown by arrows 740, 742 and 744. FIG. 10G illustrates a content and entity TLV, depicted by arrows 750 and 752. As illustrated above, the processing from the text base markup (e.g. XML) to the TLV (tokenized) form is then readily generated into either the TLA or treenode form by the generator.

FIG. 11 is an exemplary output format exhibiting the tree output representation. Referring to FIG. 11, each of the treenodes 401-409 has a type and at least one of a Qname or pointer. The tree 400 in FIG. 11 is representative of the following markup, depicted in XML format:

<first_node><child1 c2_attr = 'ttt'> text_abc</child1></first_node>

As indicated above, the Qnames index to a data value, as indicated above, and the pointers are indicative of either another tree node or a data value. The root node 402 points to child node 404, which in turn points to attribute node 406 and text node 408. The selection of the treenode types, derived from the data types of Table I, provides an optimal data structure depending on the type of data contained or referenced therein. Alternate treenode data structures, such as a general form operable to encompass all of the data types of Table I, may be employed in alternate configurations, however may not be as efficient as the treenodes addressing the specific types enumerated in Table I. In other words, the treenodes may take the form of one of several types of treenodes, depending on the data type concerned, rather then employing a single, generalized treenode type. Treenode 406 has a Qname for attribute "c2_attr" and a pointer to the string value in memory 410. Treenode 408 includes only a pointer to the corresponding attribute value 410.

Figure 12:
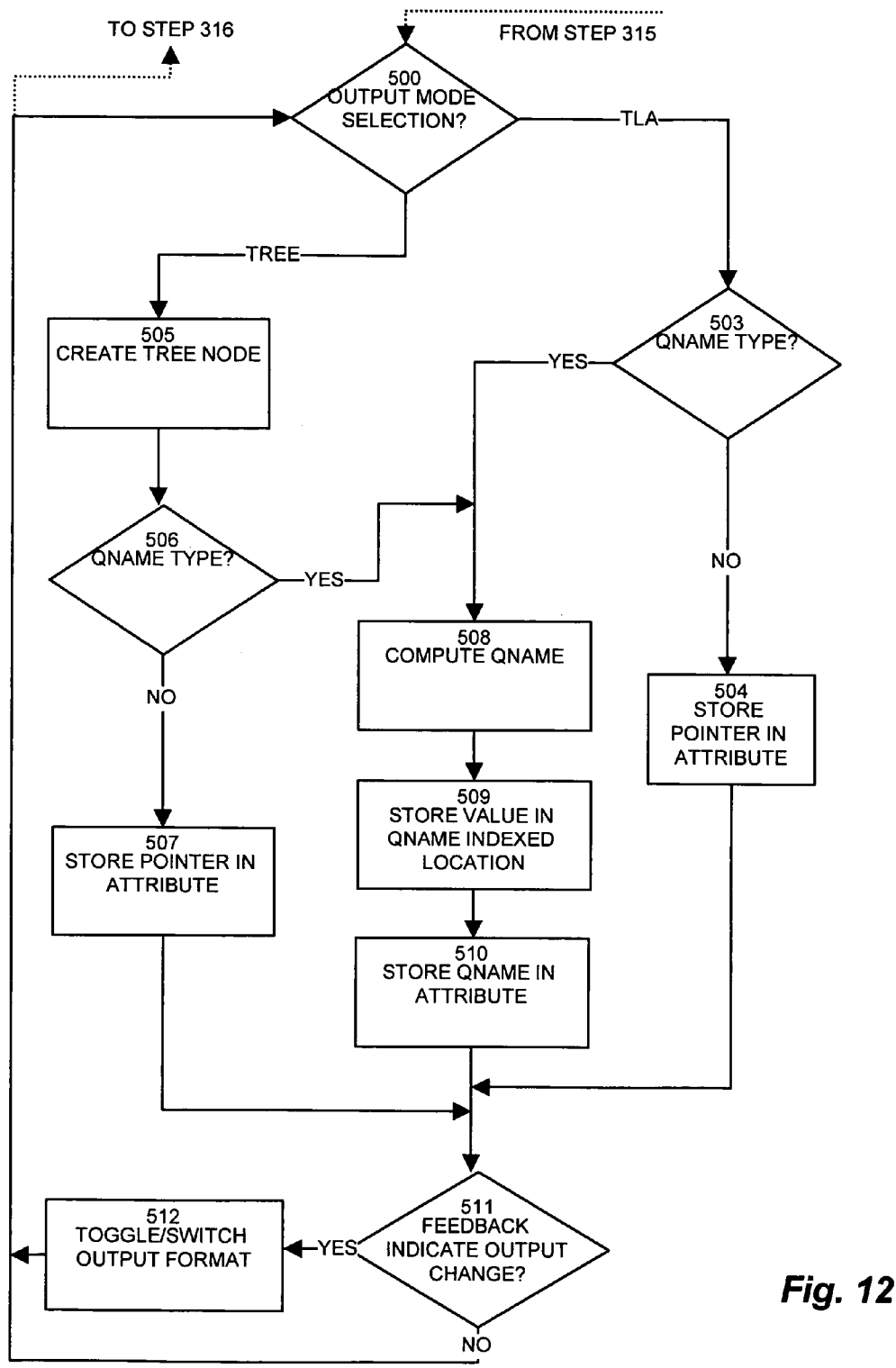
FIG. 12 is a flowchart showing selective output determination in greater detail.

FIG. 12 is a flowchart showing selective output representation in greater detail. Referring to FIG. 12, at step 500, a check is performed on the output representation selection from the configuration 140. If the output representation (mode) selection is TLA 132, then the generator 50 performs a check to determine if a Qname should be employed, as depicted at step 503. If a Qname is not applicable to the data type, then the generator stores the data value and stores the pointer to the data value as the attribute of the TLA element, as shown at step 504.

If the output representation selection calls for a treenode 136 representation at step 500, then the tree builder 116 creates a tree node, as depicted at step 505. The tree builder 116 performs a check, at step 506, to determine if a Qname output representation is specified for the data type. If a Qname is not appropriate, then the tree builder 116 stores a pointer to the data value as the attribute of the tree node.

If a Qname is specified for the data type corresponding to the token, at either step 503 or 506, then the Qname mapper 119 computes a Qname index and location for the data value, as depicted at step 508. In the particular exemplary configuration, the Qname mapper 119 receives advance notice of a Qname relevant data type from the character processor 114, and has already computed a Qname. The memory allocator 118 allocates the memory corresponding to the Qname, as described above, and stores the data value in the Qname location, as shown at step 509. The tree builder 116 then stores the Qname as the attribute of the tree node.

Following storage of the data value as an attribute in either a pointer or Qname, at step 511, the generator 50 receives feedback notification from the dynamic output selector 54 indicative of whether the output format is to toggle between the TLA or tree, output modes. If the output representation differs, then the generator toggles the output format, as depicted at step 512, and control reverts to step 316 or 500 to process successive tokens.

In the exemplary configuration discussed herein, the network is connected either directly or indirectly to a public access network such as the Internet. However, the character processor 114 expects data for a given document 158-N to be presented in order. The document 158-N can be interrupted so that fragments of the document are interleaved with other document 158-N fragments, but when a particular document resumes, the character order need to be preserved. Accordingly, such multiple documents are concurrently handled by interleaving fragments from various documents 158-N such that when the fragment for a given document 158-N is finished and a new fragment for a different document is available, the state of the current processing is captured, such as via a snapshot, stored away and the state of processing for the next document 158-N is fetched from storage, the character processor 114, acting as a state machine, loads this stored state and processing resumes for the next document fragment. In this manner, multiple concurrent input streams are receivable by the generator 50 and the context of each maintained.

In the exemplary configuration shown, the memory is accessible to both the markup device 110 and to the application 120 on the host. Further, the markup device 110 accesses physical memory 152 for the Qname 152-2 and pointer references 152-1 from the output structure 130. Therefore, while the memory 152 remains jointly accessible to both the application 120 and the device 110, the application 120 employs host 150 memory in a virtual manner. Accordingly, the markup device 110 maintains both the physical and virtual memory references to the output structure 130.

Those skilled in the art should readily appreciate that the programs and methods for an adaptive and dynamic markup processing mechanism as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), FPGAs, PLDs, state machines, controllers or other hardware components or devices, or a combination of hardware, software, and firmware components.

While the system and methods for adaptive and dynamic markup processing have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for processing an information stream of a syntactical based representation of information comprising:
parsing the information stream according to a predetermined set of syntactical rules, the syntactical rules operable to indicate a hierarchical structure of the information;
extracting tokens from the information stream, the tokens corresponding to data items and having a particular type;
processing the tokens to generate an output representation of the data items included in the information stream, determining the output representation further comprising:
   computing an initial configuration indicative of a particular output representation;
   comparing tokens in the information stream to a set of predetermined rules, the predetermined rules indicative of a policy for selecting the output representation; and
   dynamically applying the rules to augment the output representation according to the policy;
   the output representation determinable according to the particular type of the data items and a set of policy rules, and operable to preserve the hierarchical structure for further processing by a recipient application, the policy rules dynamically responsive to the parsed information stream and operable to modify the output representation in response thereto, further comprising selectively determining the output representation based on the processing capabilities of the recipient application;
wherein the output representation further comprises an enumeration of the type of data item corresponding to a token, and an indication of the location of data item corresponding of the token; and
wherein the information stream further comprises a sequence of discontiguous portions, the discontiguous portions comprising nonconsecutive memory locations, the discontiguous portions apportioned according to an external protocol specifying transmission subdivisions of the discontiguous portions, further comprising concatenating the discontiguous portions into a continuous input stream.

2. The method of claim 1 further comprising:
identifying fragments of a token corresponding to a plurality of discontiguous portions; and
marking the input stream with an indication of a forthcoming portion of data corresponding to the token.

3. The method of claim 2 further comprising:
receiving a plurality of information streams, each of the information streams represented by a sequence of discontiguous portions;
identifying, for each discontiguous portion, a corresponding input stream; and
   identifying the discontiguous portions for each of the input streams, the identification independent of the order of receipt of the discontiguous portions.

4. A content sensitive document processor comprising:
a parser operable to parse the information stream according to a predetermined set of syntactical rules, the syntactical rules operable to indicate a hierarchical structure of the information, the parser further operable to extract tokens from the information stream, the tokens corresponding to data items and having a particular type;
   a generator receptive to the parser and operable to process the tokens to generate an output representation of the data items included in the information stream, the output representation determinable according to the particular type of the data items, and operable to preserve the hierarchical structure for further processing by a recipient application;
wherein the output representation further comprises an enumeration of the type of data item corresponding to a token, and an indication of the location of data item corresponding of the token; and
wherein the information stream further comprises a sequence of discontiguous portions, the discontiguous portions comprising nonconsecutive memory locations, the discontiguous portions apportioned according to an external protocol specifying transmission subdivisions of the discontiguous portions, the parser further operable to concatenate the discontiguous portions into a continuous input stream.

5. The document processor of claim 4 wherein the parser is further operable to:
identify fragments of a token corresponding to a plurality of discontiguous portions; and
mark the input stream with an indication of a forthcoming portion of data corresponding to the token.

6. The document processor of claim 5 wherein the generator is further operable to:
receive a plurality of information streams, each of the information streams represented by a sequence of discontiguous portions;
identify, for each discontiguous portion, a corresponding input stream; and
   reassemble the discontiguous portions for each of the input streams, the reassembling independent of the order of receipt of the discontiguous portions.

7. An encoded set of processor based instructions having program code embodied in a computer readable medium for processing an information stream of a syntactical based representation of information comprising:
program code for computing an initial configuration indicative of a particular output representation; program code for comparing tokens in the information stream to a set of predetermined rules, the predetermined rules indicative of a policy for selecting the output representation;
program code for dynamically applying the rules to augment the output representation according to the policy, including performing markup processing operations on the stream of encoded items, the rules further dynamically responsive to the markup processing operations, the markup processing operations operable to compute an output format determiner indicative of an optimal type of output, further comprising:
   program code for parsing the information stream according to a predetermined syntax, the syntax operable to indicate a hierarchical structure of the information;
   program code for extracting tokens from the information stream, the tokens corresponding to data items and having a particular type; and
program code for processing the tokens to generate an output representation of the data items included in the information stream, the output representation determinable according to the particular type of the data items and a set of rules, and operable to preserve the hierarchical structure for further processing by a recipient application, the rules dynamically responsive to the parsed information stream and operable to modify the output representation in response thereto processing including switching between output formats, switching further comprising demarcating a transition in the parsed tokens between processed tokens corresponding to dissimilar output formats;

program code for returning the parsed tokens and corresponding values to the invoking application in the determined optimal format, the values being attributes indicative of a discontiguous data value, the data value accessible via indirect address computation;

wherein the output representation further comprises an enumeration of the type of data item corresponding to a token, and an indication of the location of data item corresponding of the token; and wherein the information stream further comprises a sequence of discontiguous portions, the discontiguous portions comprising nonconsecutive memory locations, the discontiguous portions apportioned according to an external protocol specifying transmission subdivisions of the discontiguous portions, further comprising program code for concatenating the discontiguous portions into a continuous input stream.

8. A content sensitive document processor comprising a memory for processing an information stream of a syntactical based representation of information comprising:

means for computing an initial configuration indicative of a particular output representation;

means for comparing tokens in the information stream to a set of predetermined rules, the predetermined rules indicative of a policy for selecting the output representation; and means for dynamically applying the rules to augment the output representation according to the policy, including performing markup processing operations on the stream of encoded items, the rules further dynamically responsive to the markup processing operations, the markup processing operations operable to compute an output format determiner indicative of an optimal type of output, further comprising:

means for parsing the information stream according to a predetermined syntax, the syntax operable to indicate a hierarchical structure of the information;

means for extracting tokens from the information stream, the tokens corresponding to data items and having a particular type; and means for processing the tokens to generate an output representation of the data items included in the information stream, the output representation determinable according to the particular type of the data items and a set of rules, and operable to preserve the hierarchical structure for further processing by a recipient application, processing including switching between output formats, switching further comprising demarcating a transition in the parsed tokens between processed tokens corresponding to dissimilar output formats;

means for returning the parsed tokens and corresponding values to the invoking application in the determined optimal format, the values being attributes indicative of a discontiguous data value, the data value accessible via indirect address computation;

wherein the output representation further comprises an enumeration of the type of data item corresponding to a token, and an indication of the location of data item corresponding of the token; and wherein the information stream further comprises a sequence of discontiguous portions, the discontiguous portions comprising nonconsecutive memory locations, the discontiguous portions apportioned according to an external protocol specifying transmission subdivisions of the discontiguous portions, further comprising means for concatenating the discontiguous portions into a continuous input stream.

* * * * *